(12) United States Patent
Basavaiah et al.

(10) Patent No.: US 9,483,286 B2
(45) Date of Patent: Nov. 1, 2016

(54) DISTRIBUTED NETWORK SERVICES

(71) Applicant: Avi Networks, Sunnyvale, CA (US)

(72) Inventors: Murali Basavaiah, Sunnyvale, CA (US); Ranganathan Rajagopalan, Fremont, CA (US)

(73) Assignee: Avi Networks, Santa Clara, CA (US)

( * ) Notice: Subject to any disclaimer, the term of this patent is extended or adjusted under 35 U.S.C. 154(b) by 206 days.

(21) Appl. No.: 14/038,532

(22) Filed: Sep. 26, 2013

(65) Prior Publication Data

US 2014/0280499 A1 Sep. 18, 2014

Related U.S. Application Data

(60) Provisional application No. 61/792,860, filed on Mar. 15, 2013.

(51) Int. Cl.
*G06F 15/16* (2006.01)
*G06F 9/455* (2006.01)
*G06F 9/50* (2006.01)
*H04L 29/08* (2006.01)

(52) U.S. Cl.
CPC ............ *G06F 9/455* (2013.01); *G06F 9/45558* (2013.01); *G06F 9/5027* (2013.01); *G06F 2009/45595* (2013.01); *H04L 67/1002* (2013.01)

(58) Field of Classification Search
CPC ..................................................... G06F 9/5027
USPC ........................................................... 709/203
See application file for complete search history.

(56) References Cited

U.S. PATENT DOCUMENTS

| | | | |
|---|---|---|---|
| 8,204,061 B1 | 6/2012 | Sane et al. | |
| 8,213,336 B2* | 7/2012 | Smith et al. | 370/254 |
| 8,352,608 B1 | 1/2013 | Keagy et al. | |
| 2010/0293281 A1 | 11/2010 | Tsimelzon et al. | |
| 2011/0271007 A1* | 11/2011 | Wang | H04L 45/306 709/238 |
| 2012/0096269 A1 | 4/2012 | McAlister | |
| 2012/0110185 A1* | 5/2012 | Ganesan et al. | 709/226 |
| 2013/0044764 A1 | 2/2013 | Casado et al. | |
| 2013/0058225 A1 | 3/2013 | Casado et al. | |
| 2013/0060929 A1 | 3/2013 | Kopenen et al. | |
| 2013/0086582 A1* | 4/2013 | Cardona | H04L 69/12 718/1 |
| 2014/0068608 A1* | 3/2014 | Kulkarni | G06F 9/45558 718/1 |
| 2014/0207968 A1* | 7/2014 | Kumar et al. | 709/244 |

* cited by examiner

*Primary Examiner* — Glenford Madamba
(74) *Attorney, Agent, or Firm* — Van Pelt, Yi & James LLP

(57) ABSTRACT

Providing a distributed network service includes: receiving network traffic at a first physical device; and executing a service engine to participate in the distributed network service. The distributed network service is provided to at least the first target application instance executing in a first VM on the first physical device, and a second target application instance executing in a second VM on the second physical device; and a shared state of the distributed network service is maintained with respect to the first physical device and the second physical device.

27 Claims, 14 Drawing Sheets

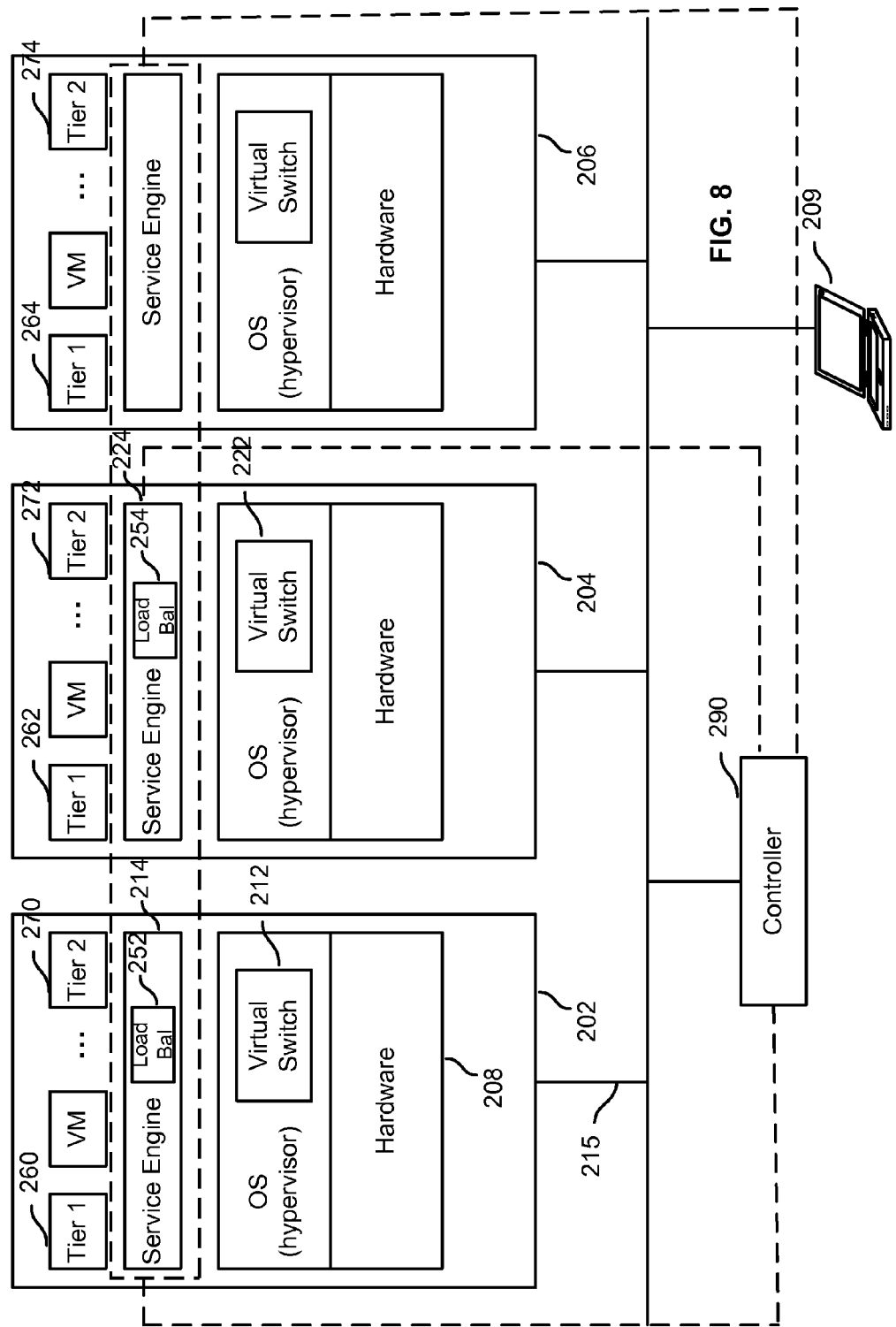

DISTRIBUTED NETWORK SERVICES

CROSS REFERENCE TO OTHER APPLICATIONS

This application claims priority to U.S. Provisional Patent Application No. 61/792,860 entitled DISTRIBUTED NETWORK SERVICES filed Mar. 15, 2013 which is incorporated herein by reference for all purposes.

BACKGROUND OF THE INVENTION

Data centers typically operate a great number of interconnected servers to implement certain network services. For example, security services such as firewalls are often used to inspect traffic for malware, intrusions, or other forms of security threats, permitting connections for authorized applications and blocking others. As another example, load balancing services are often implemented to balance workload across different servers. Other commonly employed services include content acceleration and transportation, application-specific security, network analytics, compression, etc. Currently, these network services are typically implemented on separate physical boxes each capable of handling a certain amount of traffic. On each box there is a management and control plane handling management related functions such as configuration of policies, as well as a data plane that handles executing and processing packets based on configurations. It can be difficult to deploy these physical boxes and coordinate their actions. Moreover, since many data centers now deploy multi-CPU servers on which multiple virtual machines are controlled by a hypervisor, the configuration and management of separate network services devices adds complexity and cost to the data centers.

In addition, many network services are implemented using a centralized architecture. For example, a load balancing service is typically implemented using a single load balancer that intercepts incoming traffic and redistributes the traffic to all the servers. Thus, the load balancer can be a single point of failure within the system as well as a bottle neck for traffic.

BRIEF DESCRIPTION OF THE DRAWINGS

Various embodiments of the invention are disclosed in the following detailed description and the accompanying drawings.

FIG. 8 is a block diagram illustrating an embodiment of a distributed service architecture that provides load balancing service to multiple tiers of target applications.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed network service platform is disclosed. In some embodiments, instances of target network service applications (e.g., instances of web applications, email applications, etc.) are configured to execute within virtual machines (VMs) on multiple physical devices. Multiple service engines are configured to operate on the physical devices. The service engines and a controller cooperate to implement a distributed network service for the target network applications. Traffic is redirected by the service engine to the appropriate instance of the target application for processing. The distributed network service simplifies the sharing and configuration of the processing resources of multiple physical devices, and eases the bottle neck problem commonly associated with distributed architectures having a centralized point of distribution.

Figure 1:
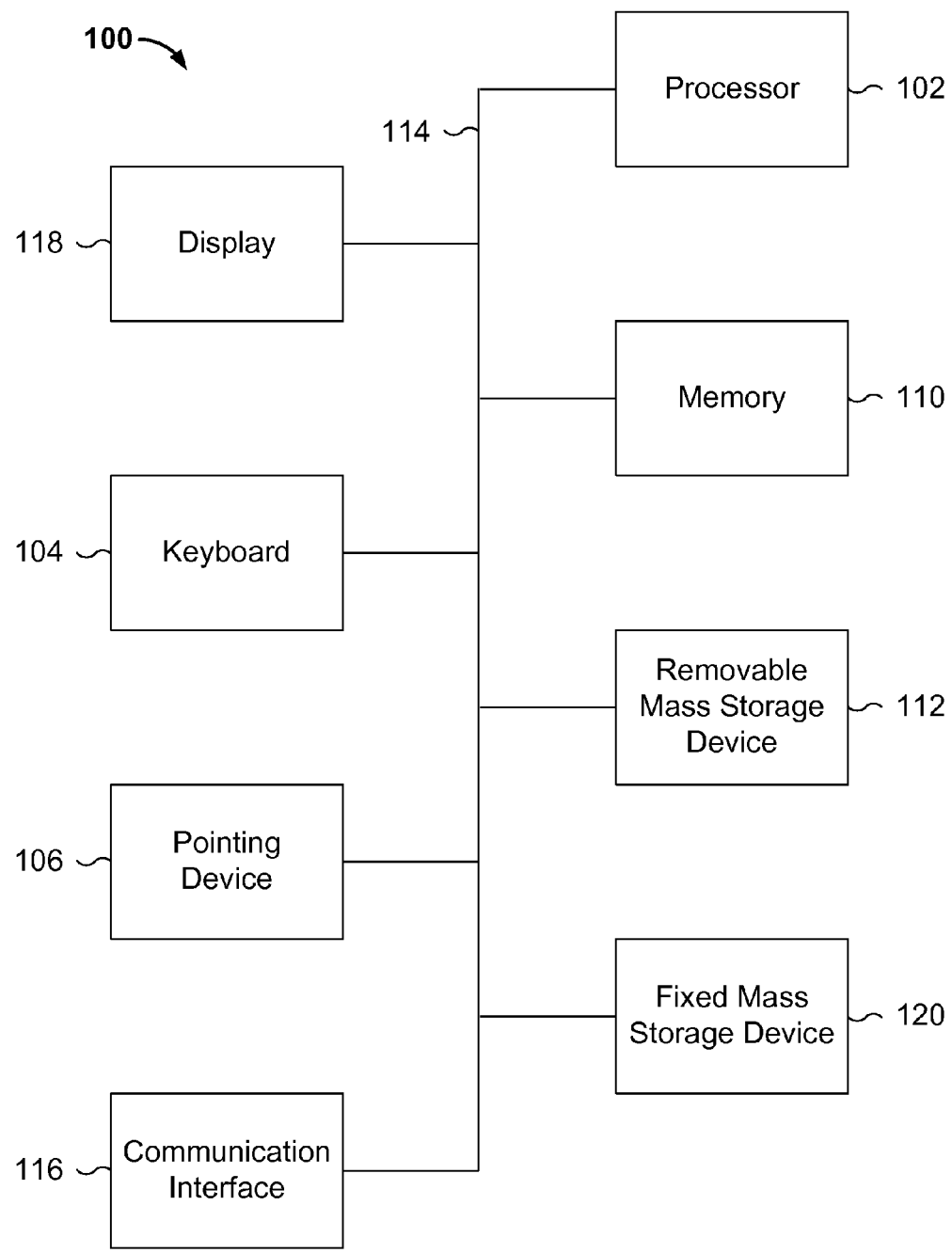
FIG. 1 is a functional diagram illustrating a programmed computer system for implementing distributed network services in accordance with some embodiments.

FIG. 1 is a functional diagram illustrating a programmed computer system for implementing distributed network services in accordance with some embodiments. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, system 100 includes multiple processors 102.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a communication interface (also referred to as a network interface) 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through communication interface 116. Examples of a communication interface include without limitation external connections, such as a port, cable, wireline or wireless network interface card, etc., and internal connections such as a communication bus.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
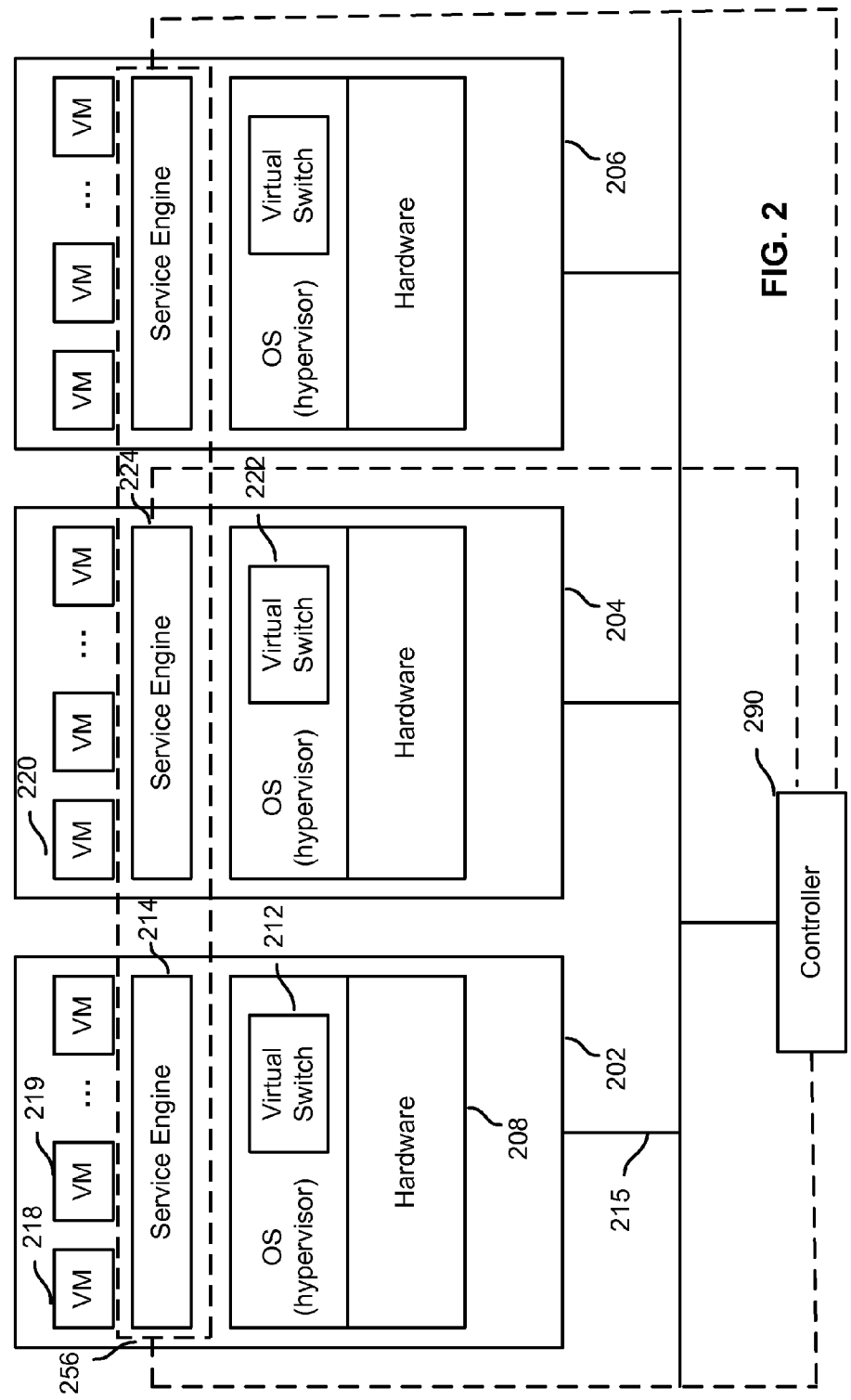
FIG. 2 is a block diagram illustrating an embodiment of a distributed network service platform.

FIG. 2 is a block diagram illustrating an embodiment of a distributed network service platform. In this example, the platform includes a number of servers configured to provide a distributed network service. A physical server (e.g., 202, 204, 206, etc.) has hardware components and software components, and may be implemented using a device such as 100. In particular, hardware (e.g., 208) of the server supports operating system software in which a number of virtual machines (VMs) (e.g., 218, 219, etc.) are configured to execute. A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMwar Workstation® and Oracle VM VirtualBox®.

In some embodiments, instances of network applications are configured to execute within the VMs. Examples of such network applications include web applications such as shopping cart, user authentication, credit card authentication, email, file sharing, virtual desktops, voice/video streaming, online collaboration, etc. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch (e.g., 212, 222, etc.). A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines (e.g., 214) are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. For example, a load balancer component is executed to provide load balancing logic to distribute traffic load amongst instances of target applications executing on the local physical device as well as other physical devices; a firewall component is executed to provide firewall logic to instances of the target applications on various devices. Many other service components may be implemented and enabled as appropriate. When a specific service is desired, a corresponding service component is configured and invoked by the service engine to execute in a VM.

In some embodiments, the performance of the target applications is monitored by the service engines, which are in turn monitored by controller 290. In some embodiments, all service engines maintain their own copy of current performance status of the target applications. A dedicated monitoring service engine is selected to send heartbeat signals (e.g., packets or other data of predefined format) to the target applications and update the performance status to other service engines as needed. For example, if a heartbeat is not acknowledged by a particular target application instance within a predefined amount of time, the monitoring service engine will mark the target application instance as having failed, and disseminate the information to other service engines. In some embodiments, controller 290 collects performance information from the service engines, analyzes the performance information, and sends data to client applications for display.

A virtual switch such as 212 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). As will be described in greater detail below, in some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application executes. In some embodiments, a service engine sends data to and receives data from a target application via the virtual switch.

A controller 290 is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof. In some embodiments, the controller is deployed within the VM of a physical device or other appropriate environment. In some embodiments, the controller interacts with client applications to provide information needed by the user interface to present data to the end user, and with a virtualization infrastructure management application to configure VMs and obtain VM-related data. In some embodiments, the controller is implemented as a single entity logically, but multiple instances of the controller are installed and executed on multiple physical devices to provide high availability and increased capacity. In some embodiments, known techniques such as those used in distributed databases are applied to synchronize and maintain coherency of data among the controller instances.

In the example shown, the service engines cooperate to function as a single entity, forming a distributed network service layer 256 to provide services to the target applications. In other words, although multiple service engines (e.g., 214, 224, etc.) are installed and running on multiple physical servers, they cooperate to act as a single layer 256 across these physical devices. In some embodiments, the service engines cooperate by sharing states or other data structures. In other words, copies of the states or other global data are maintained and synchronized for the service engines and the controller.

In some embodiments, a single service layer is presented to the target applications to provide the target applications with services. The interaction between the target applications and service layer is transparent in some cases. For example, if a load balancing service is provided by the service layer, the target application sends and receives data via existing APIs as it would with a standard, non-distributed load balancing device. In some embodiments, the target applications are modified to take advantage of the services provided by the service layer. For example, if a compression service is provided by the service layer, the target application can be reconfigured to omit compression operations.

From a target application's point of view, a single service layer object is instantiated. The target application communicates with the single service layer object, even though in some implementations multiple service engine objects are replicated and executed on multiple servers.

Traffic received on a physical port of a server (e.g., a communications interface such as Ethernet port 215) is sent to the virtual switch (e.g., 212). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine, based on factors such as configured rules and operating conditions, redirects the traffic to an appropriate target application executing in a VM on a server. Some examples of how to select an appropriate instance of the target application are described below in connection with specific example applications such as load balancing.

Figure 3:
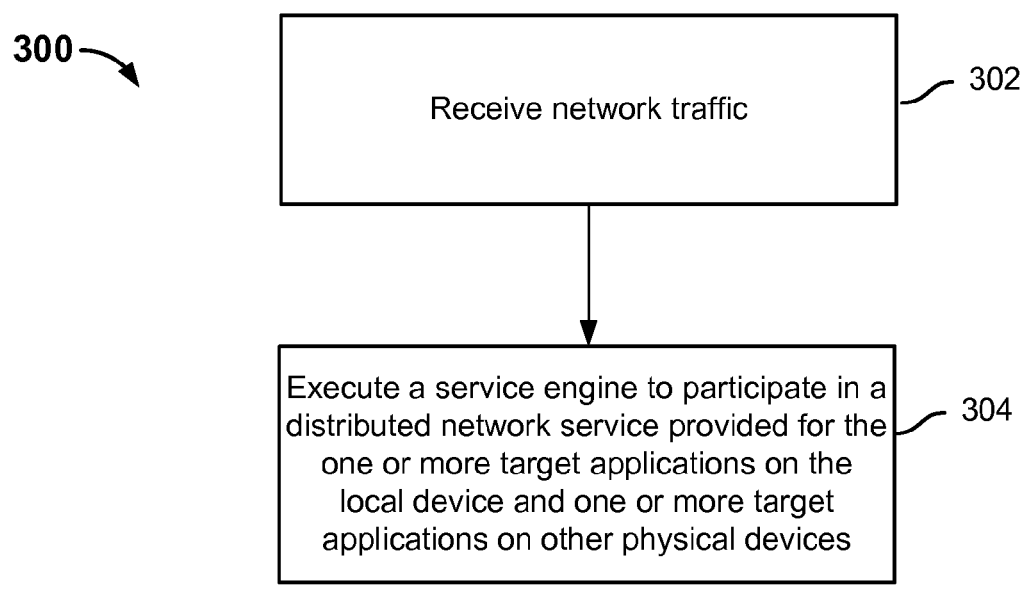
FIG. 3 is a flowchart illustrating an embodiment of a process for providing a distributed network service.

FIG. 3 is a flowchart illustrating an embodiment of a process for providing a distributed network service. Process 300 may be implemented on a device supporting multiple VMs, such as device 100.

At 302, network traffic is received. For example, one or more data packets are received at a physical port on a physical device.

At 304, a service engine is executed to participate in a distributed network service. The distributed network service is provided for one or more instances of one or more target applications executing in a VM on the local device and one or more instances of one or more target applications executing in other VMs on other physical devices, to perform networking-related processing functions such as load balancing, security, etc. on data packets designated for the target applications instances. As described above, the service engine is executed in a VM. The service engine on this device and other service engines on other physical devices cooperate to provide a distributed network service to instances of the target applications on these physical devices. As will be described in greater detail below, a virtual switch configured in in-line mode with specific target applications is used to pass traffic designated for the target applications to the service engine, which invokes the appropriate service component and redirects the traffic to the specific target applications. Depending on implementation, return traffic can bypass the service engine and be directly sent to the virtual switch and then to the physical port; or sent through the service engine to the virtual switch, and then to the physical port. A shared state of the distributed network service is maintained with respect to the physical devices. In some embodiments, data structures such as tables or lists are synchronized across different service engines operating on different devices using distributed database techniques.

The configuration and operations of the distributed network service are now described using an example where the network service is a load balancing service. The technique described herein is also applicable to other network services such as firewall, content acceleration, compression, etc.

Previously, load balancer architecture is typically centralized. Incoming traffic is usually directed to one load balancer device that serves all the servers; in contrast, in the embodiments described herein, a distributed load balancer implemented on multiple devices distributes traffic load across the servers.

Figure 4:
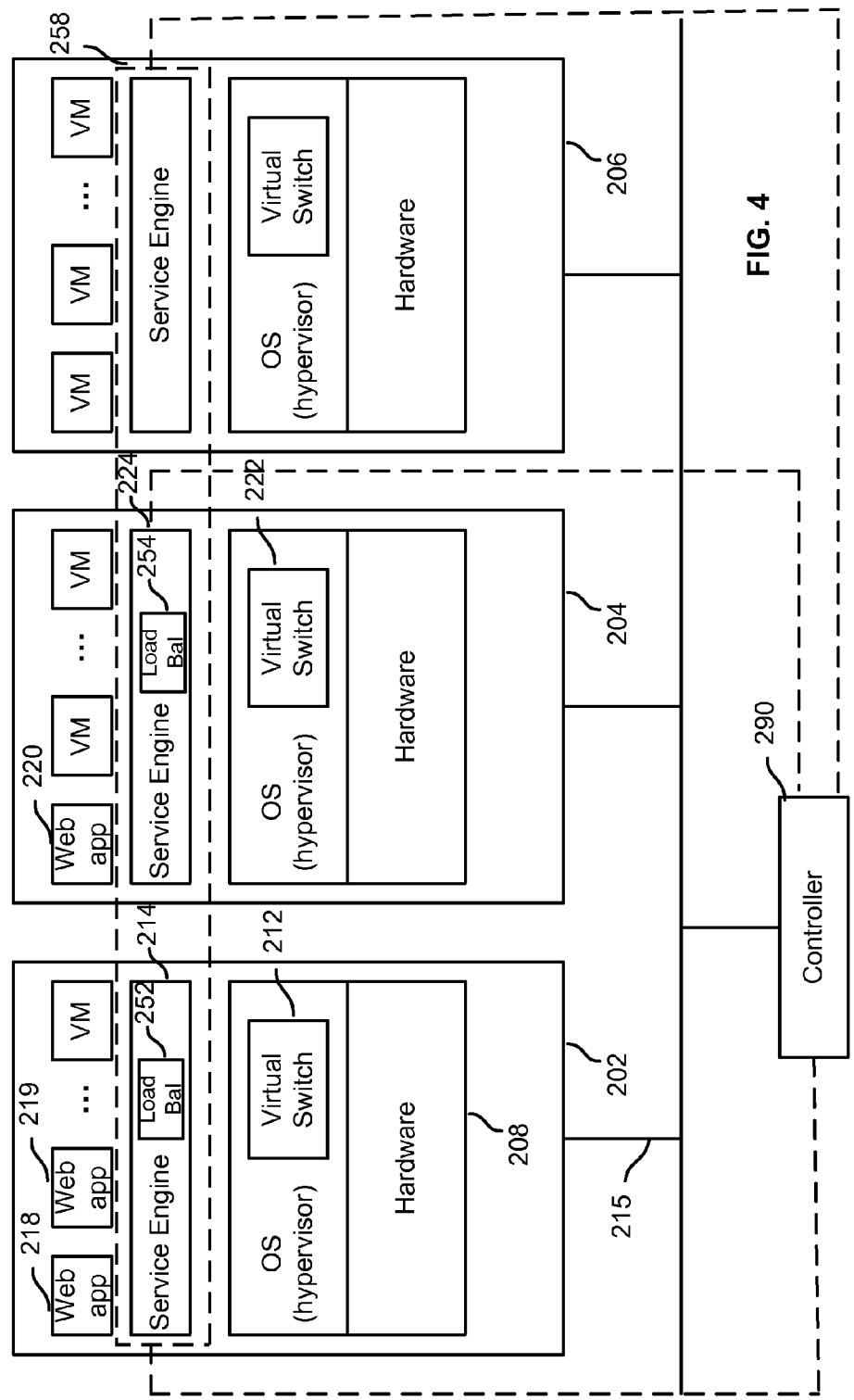
FIG. 4 is a block diagram illustrating an embodiment of a distributed service platform that provides load balancing service.

FIG. 4 is a block diagram illustrating an embodiment of a distributed service platform that provides load balancing service. In the example shown, a distributed load balancer 258 is implemented using multiple service engines (e.g., 214, 224, etc.) executing on multiple physical devices (e.g., servers 202, 204, etc.). Load balancing logic is implemented as load balancing components 252, 254, etc., which are replicated across the servers. A load balancing component may be a part of the service engine or a separate process. State/statistics information (e.g., which target applications are running on which VMs, current load on each target application, etc.) is distributed, replicated across the service engines, and synchronized by controller 290.

Figure 5:
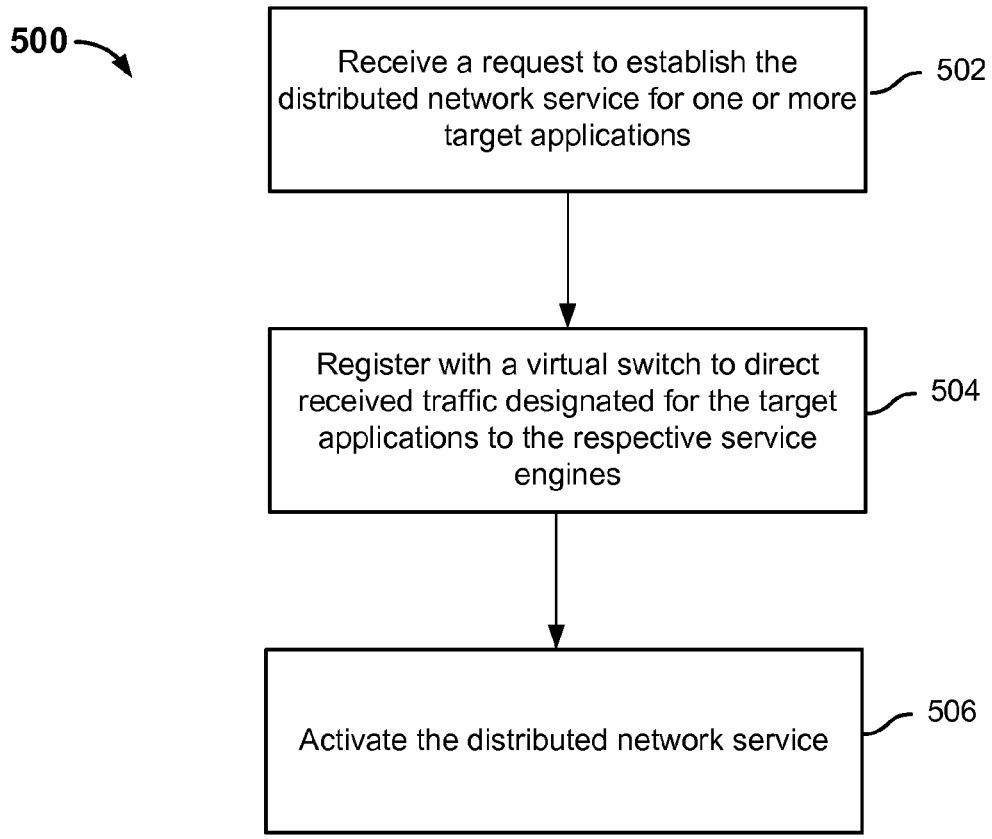
FIG. 5 is a flowchart illustrating an embodiment of a process for initializing a distributed load balancing service.

When a service such as load balancing is to be provided to certain target applications, configuration information such as a load-balancing policy is distributed to the service engines to facilitate initialization. FIG. 5 is a flowchart illustrating an embodiment of a process for initializing a distributed load balancing service.

At initialization time, as shown in 502 of process 500, a request to establish the distributed network service for the one or more target applications is received. In various embodiments, the request for the distributed network service is made in response to data entered by an administrator via a user interface, according to a configuration file or other configuration information from appropriate sources. Referring to FIG. 4 for an example, the request specifies that web applications 218, 219, and 220 are the target applications to be serviced by a distributed load balancing service. The web applications execute in their corresponding VMs.

Returning to FIG. 5, at 504, the virtual switch on the physical device executing a target application is configured to operate in an in-line mode to intercept and redirect received traffic designated for the target application to the service engine. The in-line mode configuration option is supported by the hypervisor and the appropriate configuration interface is provided by the hypervisor vendor (e.g., VMware®, Oracle®, Microsoft®, etc.). Referring again to the example of FIG. 4, service engine 214 and applications 218 and 219 register with virtual switch 212, and the virtual switch is configured to operate in in-line mode. In particular, the virtual switch is configured to intercept traffic designated for application 218 and 219 and redirect the traffic to service engine 214. In some embodiments, the configuration is performed via a virtualization infrastructure management application provided by the vendor of the virtualization infrastructure. Examples of such management applications include vCenter™ by VMWare® and System Center™ by Microsoft®. Similarly, service engine 224 and application 220 register with virtual switch 222, and virtual switch 222 is configured to operate in in-line mode with respect to traffic designated for application 220. Accordingly, traffic received on one or more communication interfaces of device 202 and designated for applications 218 or 219 is intercepted by virtual switch 212 and redirected to service engine 214, while incoming traffic received on one or more communication interfaces of device 204 and designated for application 220 is intercepted by virtual switch 222 and redirected to service engine 224.

In addition to the in-line mode configuration described above, there are other ways for the service engine to attract traffic. In some embodiments, the service engine is configured to attract traffic by taking ownership of the service's Internet Protocol (IP) and Media Access Control (MAC)

addresses. In such cases, traffic is forwarded to the service engine without additional configuration since the service engine is now the owner of the service's IP and MAC address and thus corresponds to the destination for the traffic. In some embodiments, physical network switches are configured to intercept traffic designated for applications and redirect such traffic to the appropriate service engines. Such configurations can be performed using APIs provided by the physical switches or using standard routing protocol mechanisms.

At 506, the distributed network service is activated. In some embodiments, activation includes sending policy information to the service engines and service components. In some embodiments, the activation includes instantiating the load balancing components, which may be implemented as a process, a thread, an object, or other appropriate executable construct. In some embodiments, activation includes distributing policy information (e.g., load balancing policy information including load balancing rules and status of connections) to the service engines and/or load balancing components. In some embodiments, a set of load balancing policies is stored at a central location accessible by the controller, and downloaded to the appropriate service engines. In some embodiments, the set of load balancing policies is pre-stored on local storage of each device. When a load balancing component needs to be activated on a particular service engine on a device, the controller notifies the service engine to obtain the load balancing policies from the local storage location to activate the load balancing component. Referring again to the example of FIG. 4, controller 290 notifies service engines 214 and 224 to activate load balancing components 252 and 254, respectively, and update load balancing policies.

Figure 6:
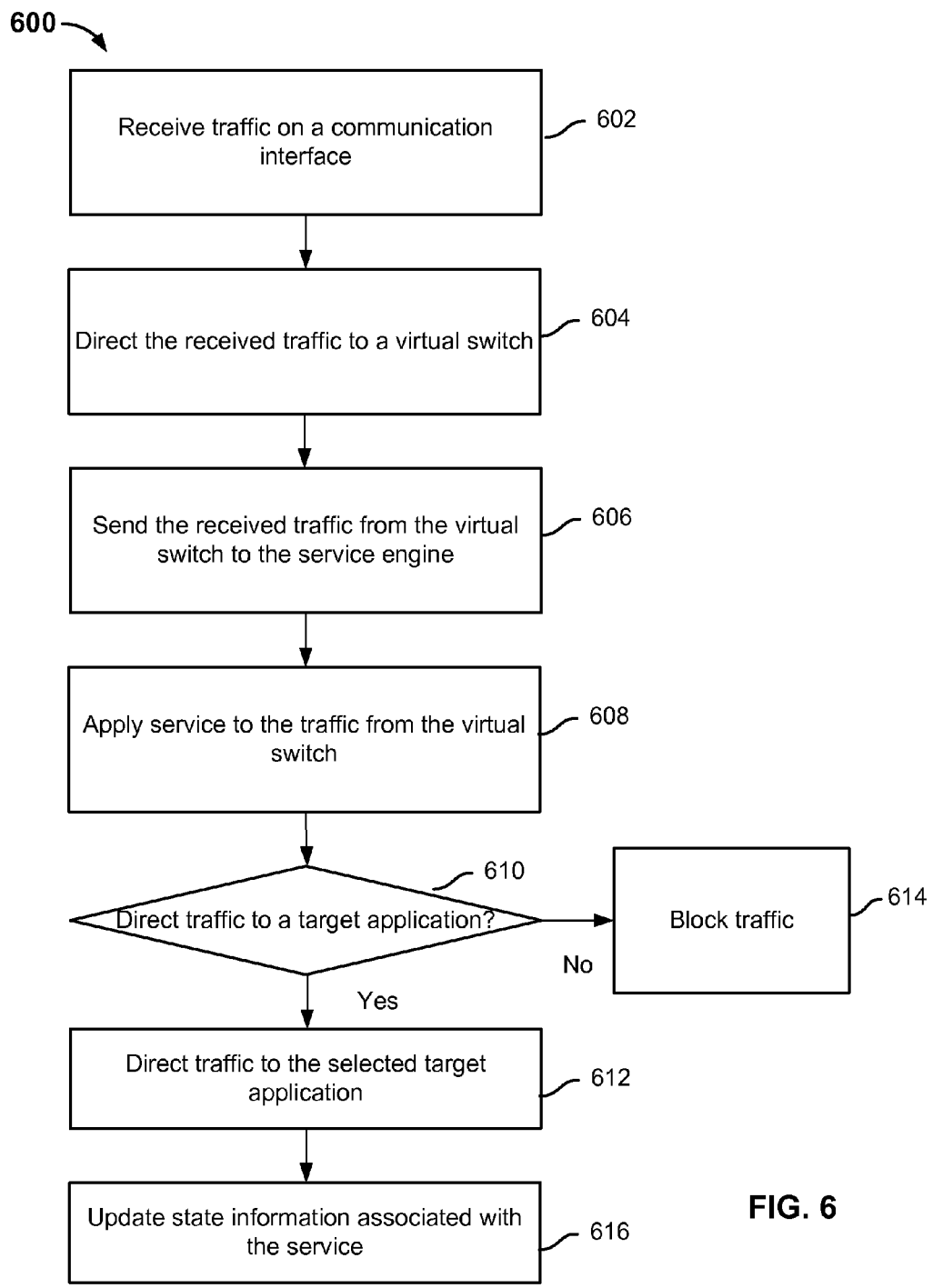
FIG. 6 is a flowchart illustrating an embodiment of a process for using the load balancer to handle incoming traffic.

FIG. 6 is a flowchart illustrating an embodiment of a process for using the load balancer to handle incoming traffic. Process 600 may be performed by a device such as 202.

At 602, traffic (e.g., packets) is received on a communication interface (e.g., a physical port) on the device.

At 604, the received traffic is directed to the virtual switch on the device. As discussed above in connection with 504 of FIG. 5, the virtual switch is configured to operate in an in-line mode to intercept the traffic.

At 606, the received traffic is sent from the virtual switch to the service engine. Referring to the example shown in FIG. 4, packets received by communication interface 215 of device 202 and designated for one or more target applications on the device are forwarded to virtual switch 212, which redirects the received traffic to service engine 214.

Returning to FIG. 6, at 608, appropriate service is applied to the traffic redirected from the virtual switch by the appropriate service component. Depending on the service component(s) configured, different types of processing logic are performed. For example, where a load balancing component is configured, the load balancing component processes the packet and applies load balancing service by determining which target application the packet should be sent; where a firewall component is configured, the firewall component applies firewall service and determines whether the packet should be passed or dropped; where a compression component is configured, the compression component compresses (or decompresses) incoming data. In some embodiments, multiple service components are configured and the processing can be sequential or in parallel. In some embodiments, the service components perform their services in a certain order. For example, firewall service is performed first. If the packet is dropped, no further processing by other service components is needed; if the packet is passed, load balancing or other services may be performed subsequently.

At 610, it is determined whether the traffic is to be directed to a selected target application, as a result of step 608. The determination is optional and may be omitted in some embodiments. In the event that the traffic is determined to be directed to a selected target application, the traffic is so directed at 612. Otherwise, no action is required and the traffic is blocked at 614. In some embodiments, log information is optionally recorded.

Referring again to the example shown in FIG. 4, assume that the header information of a received packet indicates that the packet is used to create a new TCP connection. Further assume that target web applications 218, 219, and 220 currently handle 10, 5, and 2 connections, respectively, and the load balancing logic is to direct traffic for a new connection to the target application with the fewest connections. Accordingly, load balancing component 252 on device 202 (which received the packet from virtual switch 212) directs the traffic to web application 220 (which is on device 204).

In some embodiments, multiple service components are activated by the service engine, and the packets are inspected and processed by appropriate ones of the service components. For example, assume that a load balancing component and a firewall component are activated by the service engine. If a packet's header information indicates that it is used to open a new session, it is processed by the firewall component to determine whether the connection is allowed. If it is allowed, the packet is further directed by the load balancing component to a target application deemed to have the least load, and the information is kept in a flow table. If a packet indicates that it belongs to an existing session, it may still be processed by the firewall component but is bypassed by the load balancing component. Based on flow table information, the packet, if permitted by the firewall, is sent to the target application directly.

At 616, state information associated with the service is updated. In the example of FIG. 4, a connection table is maintained by controller 290 to track the target applications and the respective number of connections being handled. The table indicates that target web applications 218, 219, and 220 correspond to ten, five, and two connections, respectively, before the packet for the new connection is processed. After the packet is sent to web application 220, the corresponding entry in the table is updated from two connections to three. The state information may be maintained on the controller, distributed to individual service engines, or both.

Figure 7:
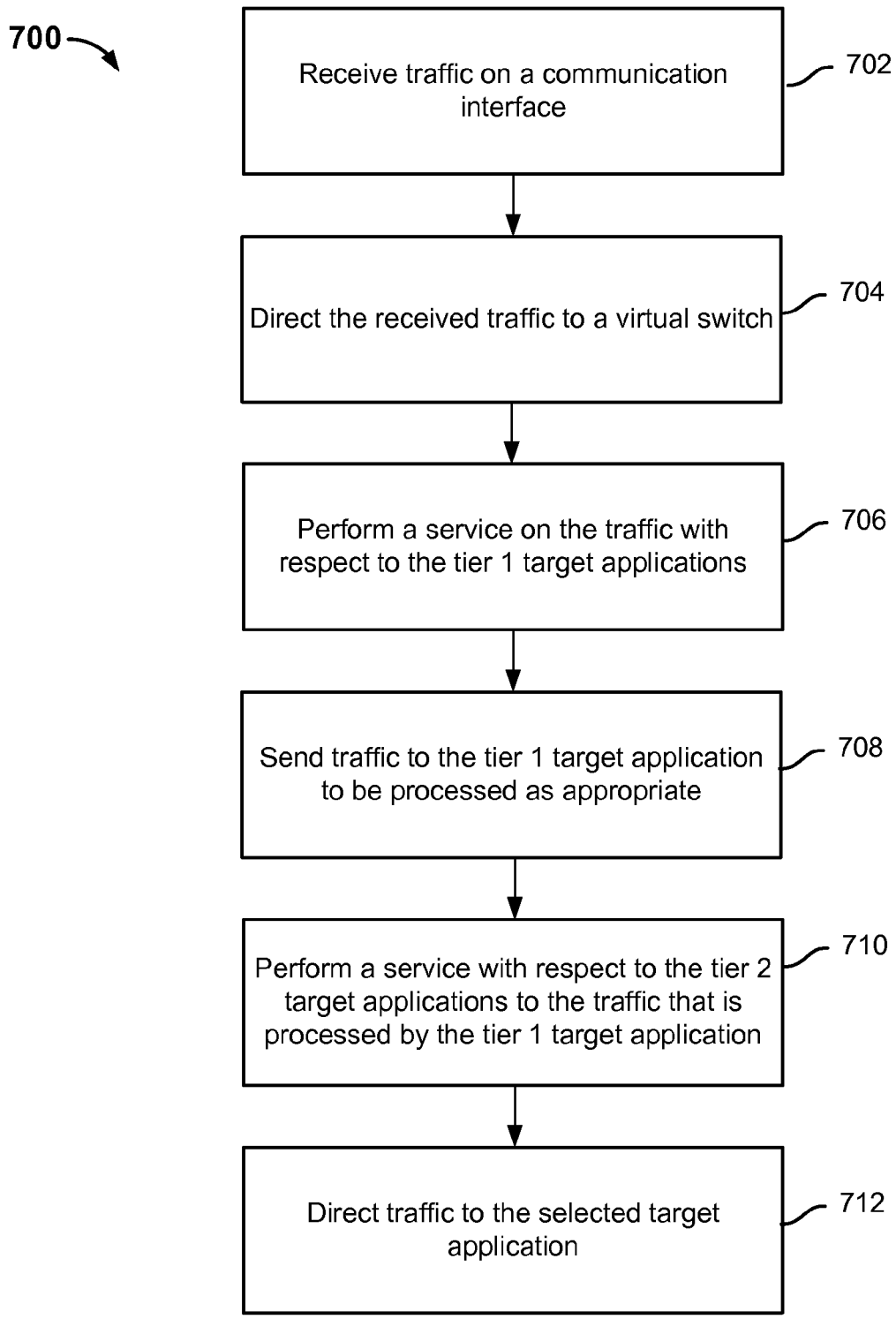
FIG. 7 is a flowchart illustrating an embodiment of a process for servicing multiple tiers of target applications.

In some embodiments, the distributed network service layer services multiple target applications organized in multiple tiers. For example, in an online shopping platform, user authentication applications are configured to be tier 1 applications and shopping cart applications are configured to be tier 2 applications. FIG. 7 is a flowchart illustrating an embodiment of a process for servicing multiple tiers of target applications. As will be described in greater detail below, process 700 may be performed by one or more devices.

At 702, traffic (e.g., packets) is received on a communications interface (e.g., a physical port) on a device. At 704, the received traffic is directed to the virtual switch on the device. These steps are similar to 602 and 604 of process 600.

FIG. 8 is a block diagram illustrating an embodiment of a distributed service architecture that provides load balancing service to multiple tiers of target applications. In this example, target applications 260, 262, and 264 are tier 1 applications (e.g., user authentication applications) currently handling twenty, four, and five connections, respectively. Target applications 270, 272, and 274 are tier 2 applications (e.g., shopping cart applications) currently handling twenty, fifteen, and eight connections, respectively. Referring to process 700, a packet received by communication interface 215 of device 202 is forwarded to virtual switch 212. The virtual switch redirects the received traffic to the service engine.

Returning to FIG. 7, at 706, a first selected service component is used to perform a service on the received packet with respect to the tier 1 target applications. In some embodiments, the first selected service component is the service component operating on the same device as the virtual switch since it is the closest service component. In some embodiments, a specific service component is set to perform the service with respect to the tier 1 target applications. For example, a particular service component is set to attract all the traffic received from outside and perform tier 1 load balancing, and thus this service component corresponds to the first selected service component. At 708, the packet is sent to the selected tier 1 target application to be processed as appropriate. Referring to the example shown in FIG. 8, virtual switch 212 directs the received packets to load balancing component 252, which will redirect the packets to target application 262 on server 204 since this application has the lowest number of connections among tier 1 applications.

Returning to FIG. 7, at 710, a next selected service component is selected to apply a service with respect to the tier 2 applications to the traffic that is processed by the tier 1 target application. At 712, the next selected service component redirects traffic to a selected tier 2 application to be further processed as appropriate. In some embodiments, the next selected service component is the service component operating on the same device as the tier 1 target application. Referring again to FIG. 8, after target application 262 on server 204 processes the packet, it returns the packet to local service engine 224. Based on the service engine's configuration (which indicates that the packet needs to be processed by tier 1 and tier 2 applications) and the current state of the packet (which can be a marker on the packet indicating that the packet has been processed by a tier 1 application only), the service engine invokes its local load balancing component 254 to apply load balancing service. Load balancing component 254 identifies application 274 on server 206 as the target application with the lowest number of connections among tier 2 applications, and redirects the packet to be further processed by application 274.

If there are additional tiers, steps 710-712 may be repeated for each additional tier to further process the traffic, and select the appropriate target application for that tier to redirect the traffic.

In the example above, the load of a target application is measured in terms of number of connections, and the target application with the least number of connections is selected. Other load measurements and load balancing schemes can be configured as appropriate. In some embodiments, topology information such as distances associated with respective servers are determined and used as an additional factor in measuring the load of a target application and selecting the least busy one. For example, the number of hops, the physical distance, or other topological measurements to individual servers can be used as costs/weights used to adjust the load measurement. Load measurement that accounts for topological information is referred to as topological load measurement. A number of topological load measurement formulas are used in various embodiments; an example is shown in equation (1) below.

Referring again to FIG. 8 for an example where for a particular load balancer component, the load of a target application i with respect to a load balancing component j is measured in terms of a topological load. The topological load measurement is expressed as follows:

$$L_{ij} = C_i * (H_{ij} + 1) \qquad (1)$$

where $L_{ij}$ corresponds to the load measurement of application i with respect to load balancing component j, which can be in terms of number of packets processed per second or any other appropriate measurements; $C_i$ is the number of connections being handled by application i; and $H_{ij}$ is the number of hops between the target application i and the load balancer component j. As used herein, a hop corresponds to a physical connection between two devices such as a router, switch, server, or the like on the network. If the application is on the same device as the load balancer, the number of hops is 0.

Based on equation (1) and knowledge about the topology, the load of tier 1 target applications 260, 262, and 264 with respect to load balancing component 252 are computed as follows:

$$L_{260\ 252} = C_{260} * (H_{260\ 252} + 1) = 20 * (0+1) = 20$$

$$L_{262\ 252} = C_{262} * (H_{262\ 252} + 1) = 4 * (3+1) = 16$$

$$L_{264\ 252} = C_{264} * (H_{264\ 252} + 1) = 5 * (1+1) = 10$$

Since target application 264 is deemed to have the least load, a packet entering device 202 is sent to this target application by load balancer 252. It is further noted that a packet may be load balanced to different target applications depending on which device the packet enters into, since the relative topological load measurements can differ depending on the particular load balancer component on the device and the relative number of hops to the target applications.

As discussed above, the typical networking device used by network operators today is a stand-alone box. Software or hardware modules for processing data packets or provisioning and managing network services are typically installed and executed on the same device. In embodiments of systems described herein, a data plane is disaggregated from a control plane both functionally and physically. As used herein, a data plane refers to software, hardware, firmware, or a combination thereof that performs packet processing logic such as load balancing, security, etc. A control plane refers to software, hardware, firmware, or a combination thereof that performs management and control functions (also referred to as controller functions), such as: provisioning, creating, and modifying policies for network services; coordinating with the service engines and the virtualization infrastructure; monitoring; statistics generation and analysis; interactions with user applications, etc.

Referring again to the example network services platform shown in FIG. 8, the example platform includes one logical data plane comprising multiple physical data planes that are physically distributed across multiple physical devices. Examples of the physical data planes include service engines 214, 224, etc., that are configured to execute on VMs on a plurality of physical devices. The physical data planes act as a single logical entity by cooperating to process packets received on by the physical devices, transmitted by the physical devices, or both. The external application sending data to the target applications and the target applications themselves do not need to track which data plane (service engine) processed the packet, and the processing is transparent to the external application and the target applications. Data processed by a physical data plane is forwarded to a target application to be further processed according to the application's specifications. For example, an incoming packet is load balanced by the data plane, and then forwarded to a web server application to determine a webpage that should be sent to the user.

The platform further includes one logical control plane comprising a controller 290. In some embodiments, the logical control plane is implemented using a plurality of physical control planes (also referred to as redundant control planes). The physical control planes (e.g., multiple processes) operate on one or more physical devices but share data and states to act as a single logical entity. The physical devices on which the control plane is implemented can be but are not necessarily the same devices as the ones implementing the data plane (e.g., servers 202-206). In some embodiments, the individual control components share and synchronize data using standard clustering techniques to provide redundancy.

In FIG. 8, a client device 209 is connected to the network and configured to communicate with the controller using a client application, via predetermined APIs and protocols. The client device can be implemented as a laptop computer, a desktop computer, a tablet, a mobile device, a smart phone, or any other appropriate computing device. In some embodiments, a web browser or a standalone client application is installed on the client device, providing user interface facilities for users to access the controller to manage and control the network services.

In one aspect, the controller is configured to interact with client applications over the network to manage and provision services on the distributed platform. For example, when configuration information pertaining to a target application and its associated network service is entered by a user, the controller obtains configuration information, notifies appropriate service engines, and provides them with configuration information (e.g., policy information) associated with the new target application.

Figure 9A:
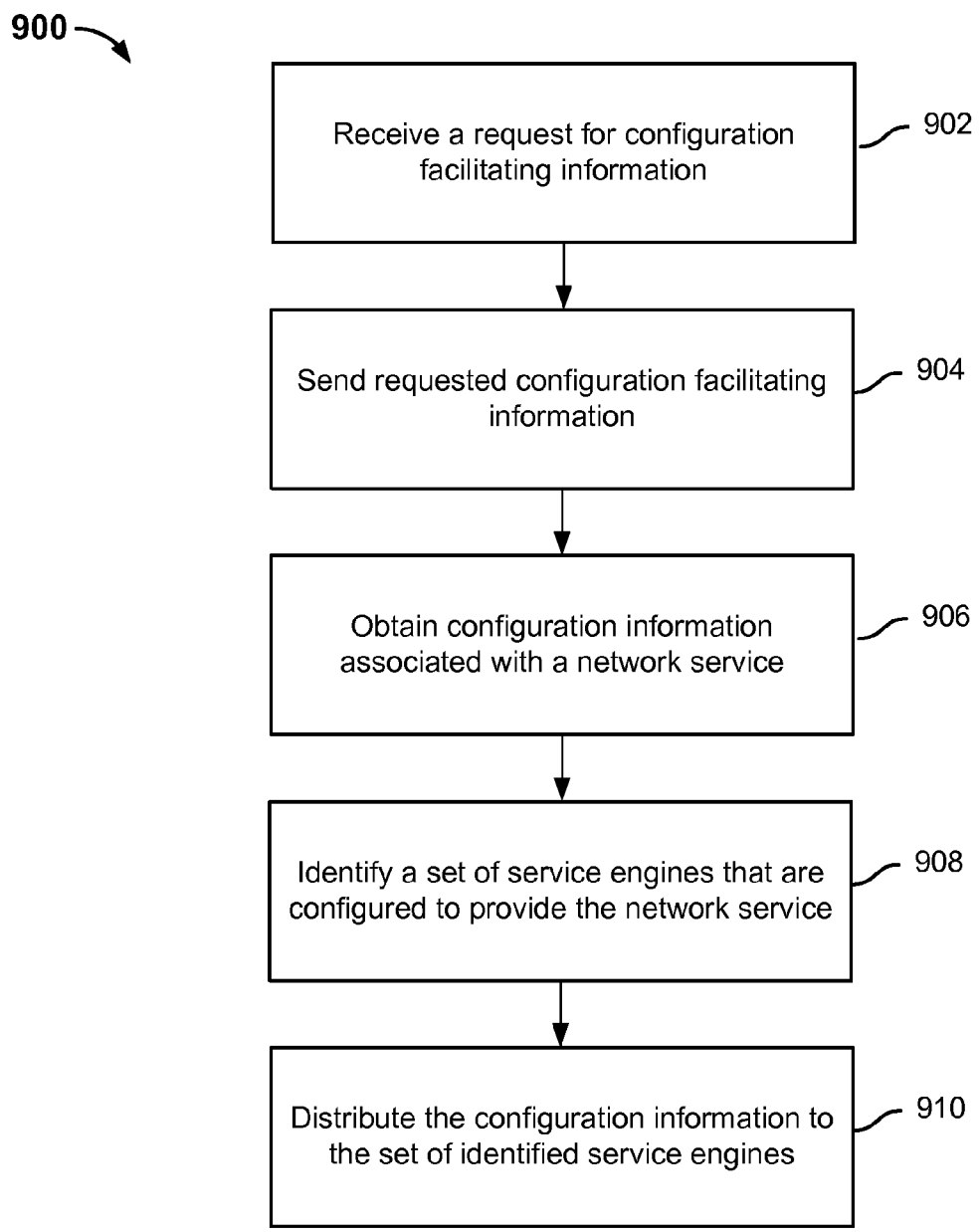
FIG. 9A is a flowchart illustrating an embodiment of a process for interacting with a client application.

FIG. 9A is a flowchart illustrating an embodiment of a process for interacting with a client application. In some embodiments, process 900 is performed by a controller to provision configuration information for a target application.

In the example, the process is invoked in response to a user action. Using a client device such as 209 of FIG. 8, the user accesses a client application, which provides a command line, graphical, or any other suitable form of user interface for the user to configure one or more network services. For example, the client application provides a user interface (e.g., a dropdown box or the like) for the user to specify a configuration request, such as a request to configure a load balancing service for a web server application.

In some embodiments, APIs are provided for the client application or other appropriate external applications to communicate with the controller to manage network services and provision configuration information (e.g., policies) for target applications and network services. For example, in some embodiments, the controller implements network service policies as objects, and the client application uses the APIs to instruct the controller to create, modify, and delete the policy objects.

At 902, a request based on controller APIs is optionally generated by the client application and received by the controller. The request may indicate that information used to facilitate the configuration process, such as the format of a load balancing policy, is needed by the client application.

At 904, the controller optionally provides the client application with the requested information. For example, in some embodiments, the controller sends the client application a specification of a load balancing policy object (including the object's attributes), or a form with fields that correspond to such attributes. Examples of the load balancing policy attributes include domain name, identifiers/locations of target application instances, identifiers/locations of load balancing methods, identifiers/locations of health check methods to be performed on the application instances, identifiers/locations of the content transformation and content security policies, etc. The client application displays the attribute fields or the form in the user interface. In some embodiments, the client application has built-in knowledge about the format of the configuration information. The client application therefore omits steps 902-904 and displays the requisite fields in the user interface directly.

The fields are initially blank or filled with default values. The user fills out appropriate values corresponding to these attributes. These values are collected as configuration information associated with the network service (in this case, load balancing policy information associated with a load balancer service for a web server application). The configuration information is submitted to the controller using controller APIs. Thus, at 906, configuration information associated with the network service for a particular type of target application is obtained, and optionally saved by the controller.

At 908, a set of service engines that are configured to provide the distributed network service is identified. In some embodiments, the controller makes the identification by querying the management application of the virtualization infrastructure. Service engines on the same devices as VMs in which instances of the target application are executing are identified as service engines that require the configuration.

Figure 10:
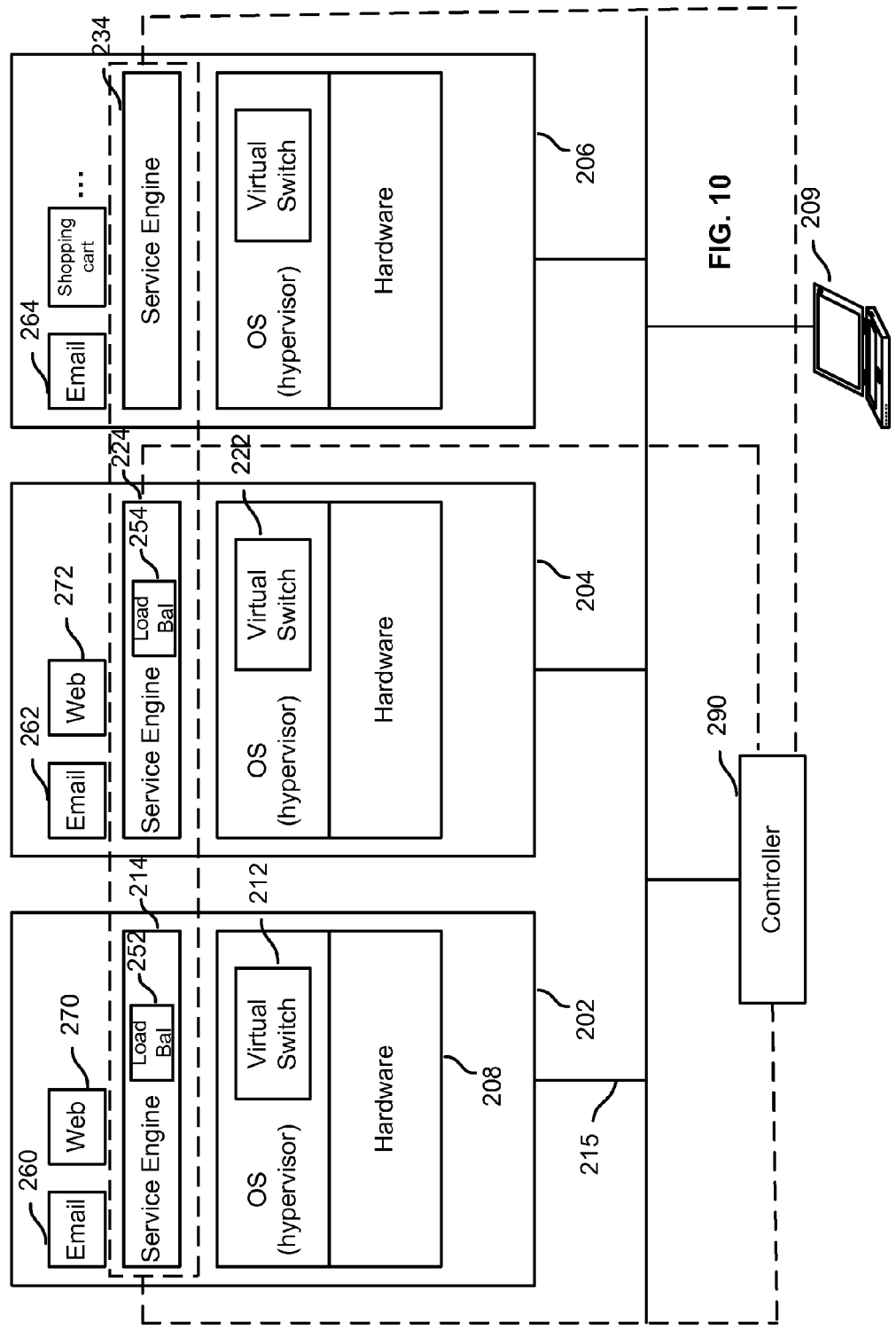
FIG. 10 is a block diagram illustrating an embodiment of a distributed service architecture on which multiple target applications are configured.

An example of the above embodiment is depicted in FIG. 10. FIG. 10 is a block diagram illustrating an embodiment of a distributed service architecture on which multiple target applications are configured. Suppose that the obtained configuration information is a load balancing policy for a particular web server application. The controller queries the virtualization infrastructure management application to determine which VMs are running instances of the web server application, and/or which service engines are operating on the same devices as the VMs. In some embodiments, the virtualization infrastructure management application provides APIs for making such queries. In this example, the virtualization infrastructure management application determines that instances of the web server application are running on VMs 270 and 272 on servers 202 and 204, respectively; and no web server application instance is running on server 206. The virtualization infrastructure management application further identifies the service engines on the same devices as these VMs as the service engines to which the configuration information should be sent. In this case, service engines 214 and 224 are identified as service engines that will receive the load balancing policy, and service engine 234 is not.

Returning to FIG. 9A, at 910, the obtained configuration information is sent to the set of identified service engines to be applied. Referring again to the example of FIG. 10, the load balancing policy is sent to service engines 214 and 224 to create and configure load balancing components 252 and 254, respectively. The policy does not have to be sent to service engine 234 since there is no web server application to be serviced by this service engine.

In the above example, the configuration information is directly applied to the identified service engines. In some embodiments, the controller optionally presents the identified service engines to the user (via the client application) so that he may select a subset of the service engine to which the policy is applied. For example, the client application may present to the user the information that that service engines 214 on server 202 and service engine 224 on server 204 both service the web server application, and the user is given the option to select one of the service engines to apply the policy to and leave out the other one.

Figure 9B:
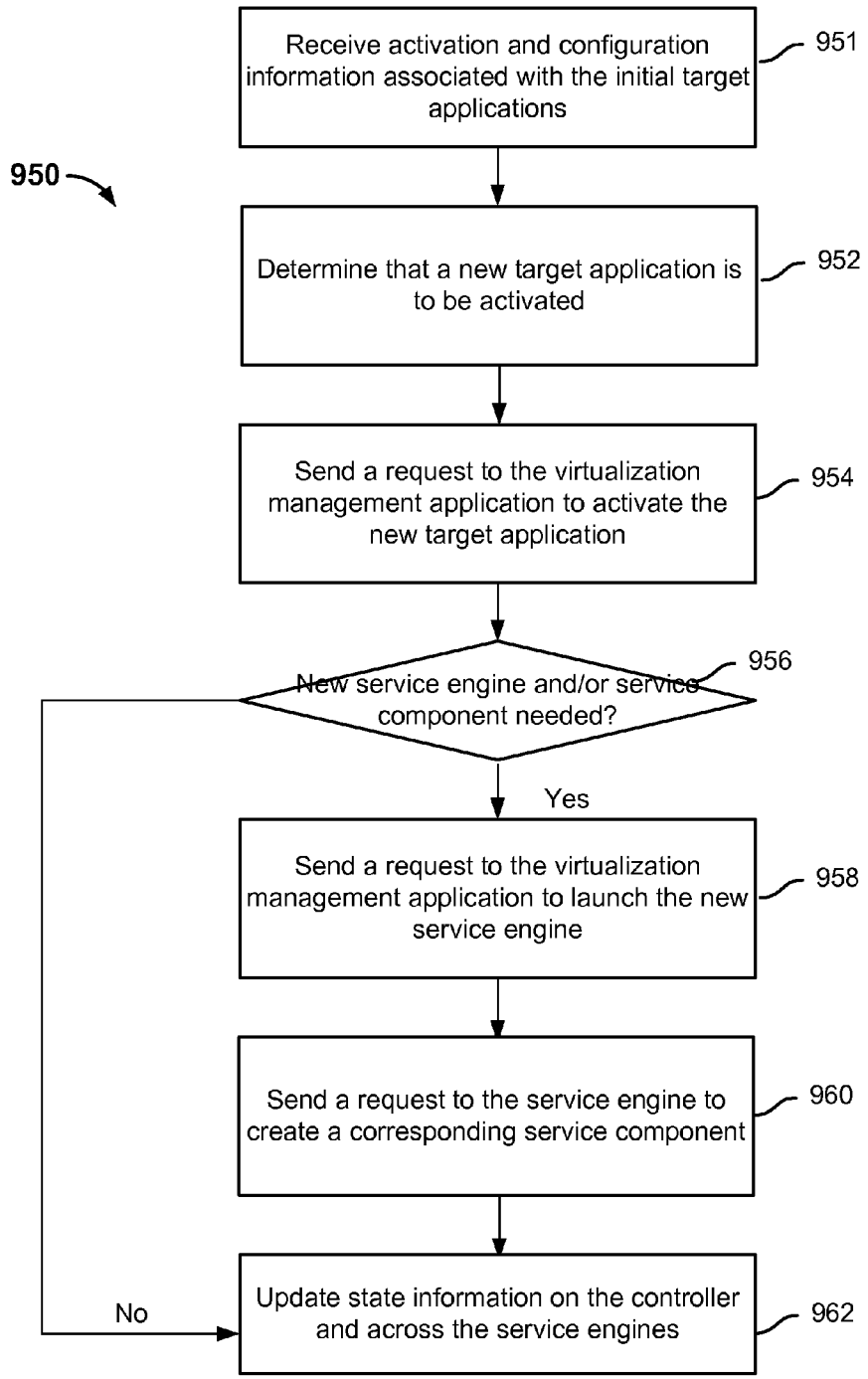
FIG. 9B is a flowchart illustrating another embodiment of a process for provisioning a new target application.

FIG. 9B is a flowchart illustrating another embodiment of a process for provisioning a new target application. In some embodiments, process 950 is performed by a controller.

At 951, activation and configuration information associated with an initial set of target applications is received at the controller. In some embodiments, the target applications are initially activated by a user/operator using a client application and the controller is informed of the activations. For example, the user can request that a new email application be activated on the platform, and specify the number of instances of the email application that should be launched on which VMs. The configuration information and indications of whether the activations are successful are received by the controller.

At 952, it is determined that a new target application is to be activated. The determination can be made in response to a variety of events. In some embodiments, the determination is made when the controller queries the virtualization infrastructure management application for statistics information about the existing target applications, and receives an indication that the existing target applications are not providing sufficient capacity. For example, the controller queries the virtualization manager for statistics associated with specific network addresses, network name, tags associated with the virtual machines, or other identification information. If the statistics returned by the virtualization manager indicate that a maximum number of connections have been reached or the CPU or memory usage is at maximum level, then the controller will determine that a new application should be added. In a multi-tier environment, the new target application can be of any appropriate tier.

At 954, the controller sends a request to the virtualization infrastructure management application to activate one or more new target applications. In some embodiments, the request is based on the initial VM configuration of the initial set of target applications. For example, the controller may send a request to the virtualization infrastructure to request that the same number of new email application instances be instantiated on certain available VMs. In some embodiments, the controller uses virtualization infrastructure management application APIs to request instances of the application to be launched on specific VMs.

At 956, the controller determines whether a new service engine is needed. In some embodiments, the controller makes the determination based on its state information, which records information about the existing target applications, service engines, and service components. If a new service engine and/or service component isn't needed, the process continues at 962. If the new target application is launched on a device without an existing service engine, a new service engine and a corresponding service component are needed. Thus, at 958, the controller sends a request to the virtualization infrastructure management application to launch a corresponding new service engine. In some embodiments, process 1100 described below is used to implement this step. In some embodiments, the controller in addition receives and verifies acknowledgements from the virtualization infrastructure (not shown).

In this case, a service component is needed to service the new target application. If no new service engine is needed, or if a new service engine is created, control proceeds to 960, where a request is sent to the service engine to create or activate a corresponding service component for the new target application.

At 962, state information is updated on the controller and across the service engines (including the new service engine). The state information includes configuration information and/or policies required by the service component and shared state information necessary for performing the service across the service engines. For example, in some embodiments, the configuration topology is updated to reflect the addition of the new target application, the new service engine, and/or the new service component to the platform; in some embodiments, the load balancing policy and statistics for each tier of target applications are updated on the controller to reflect the addition of the new target application that is available to receive traffic from the distributed load balancers, and the information is also sent to the service engines to be locally stored. In some embodiments, statistical information is initialized. For example, a global load balancing connections table is updated to indicate that the new target application currently has zero connections.

Figure 11:
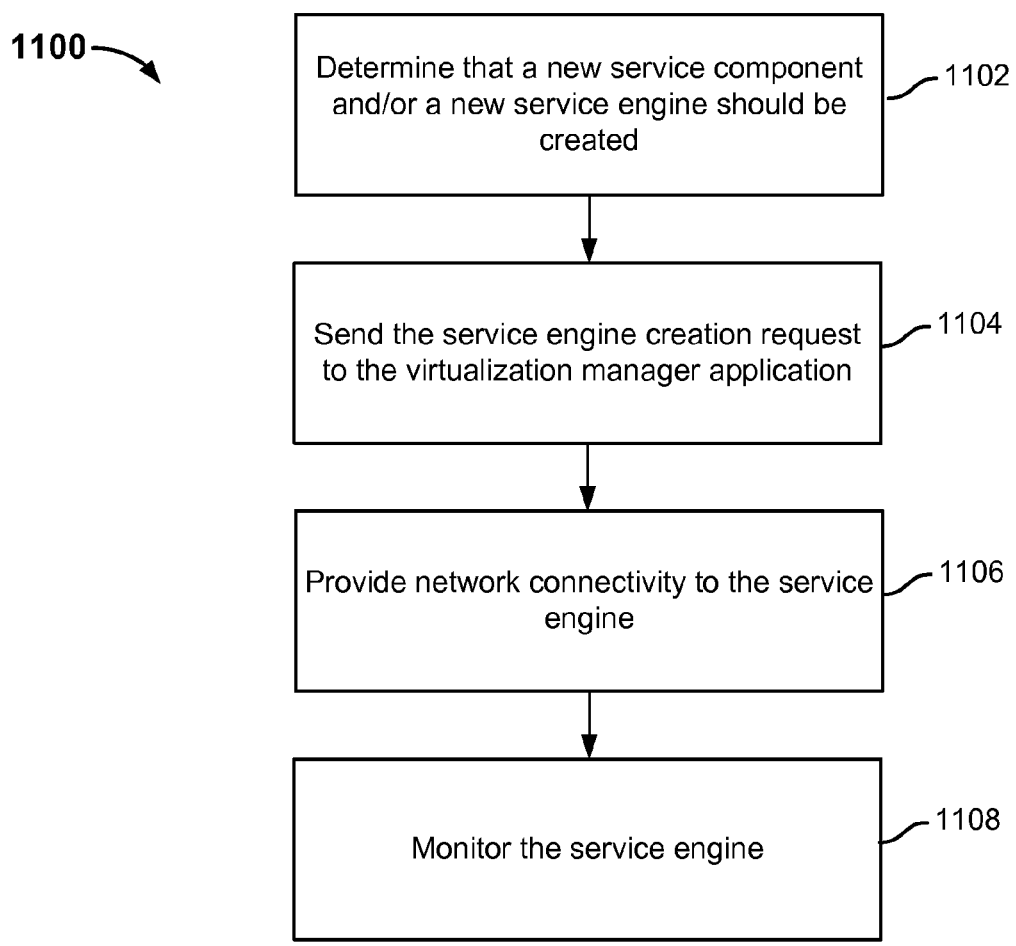
FIG. 11 is a flowchart illustrating an embodiment of a process that interacts with the service engine.

In another aspect, the controller is configured to interact and coordinate with the service engines. In particular, the controller creates, provisions, and monitors the service engines. FIG. 11 is a flowchart illustrating an embodiment of a process that interacts with the service engine. In some embodiments, process 1100 is performed on a controller. At 1102, it is determined that a new service engine is to be created. The determination can be made in response to a variety of events. In some embodiments, the controller makes the determination when a service is launched for the first time. In some embodiments, the controller monitors the resources (e.g., number of connections, amount of bandwidth, etc.) available on the active service engines, and when it is determined that the amount of a resource has fallen below a threshold, the controller determines that a new service engine is to be created. In some embodiments, the user uses the client application to create a new application that requires a new service component (e.g., a new web server that requires a load balancer) on a physical device that does not already have a service engine, and upon receiving the creation request, the controller determines that a new service engine should be created to cooperate with the new service component.

At 1104, the service engine creation request is sent to the virtualization infrastructure management application. For example, the controller may request a new service engine be created on a server having a specific IP address or host name (e.g., the server identified by the controller as currently least busy), using APIs provided by the virtualization manager vendor.

At 1106, network connectivity is provided to the service engine. Specifically, the controller requests the virtualization infrastructure management application to configure the virtual switch on the device to redirect all traffic designated for certain target application(s) to the service engine. The request can be implemented using APIs provided by the vendor of the virtualization infrastructure management application.

Once the service engine is activated, it (including its associated service component) is monitored, at 1108. In some embodiments, the service engine is periodically polled to supply statistic information such as the number of connections being handled, amount of bandwidth available, etc. In some embodiments, the service engine sends out a heartbeat signal and/or other statistics information to the controller at some predefined interval. Failure to obtain the statistics information and/or the heartbeat information will indicate that the service engine has failed.

Figure 12:
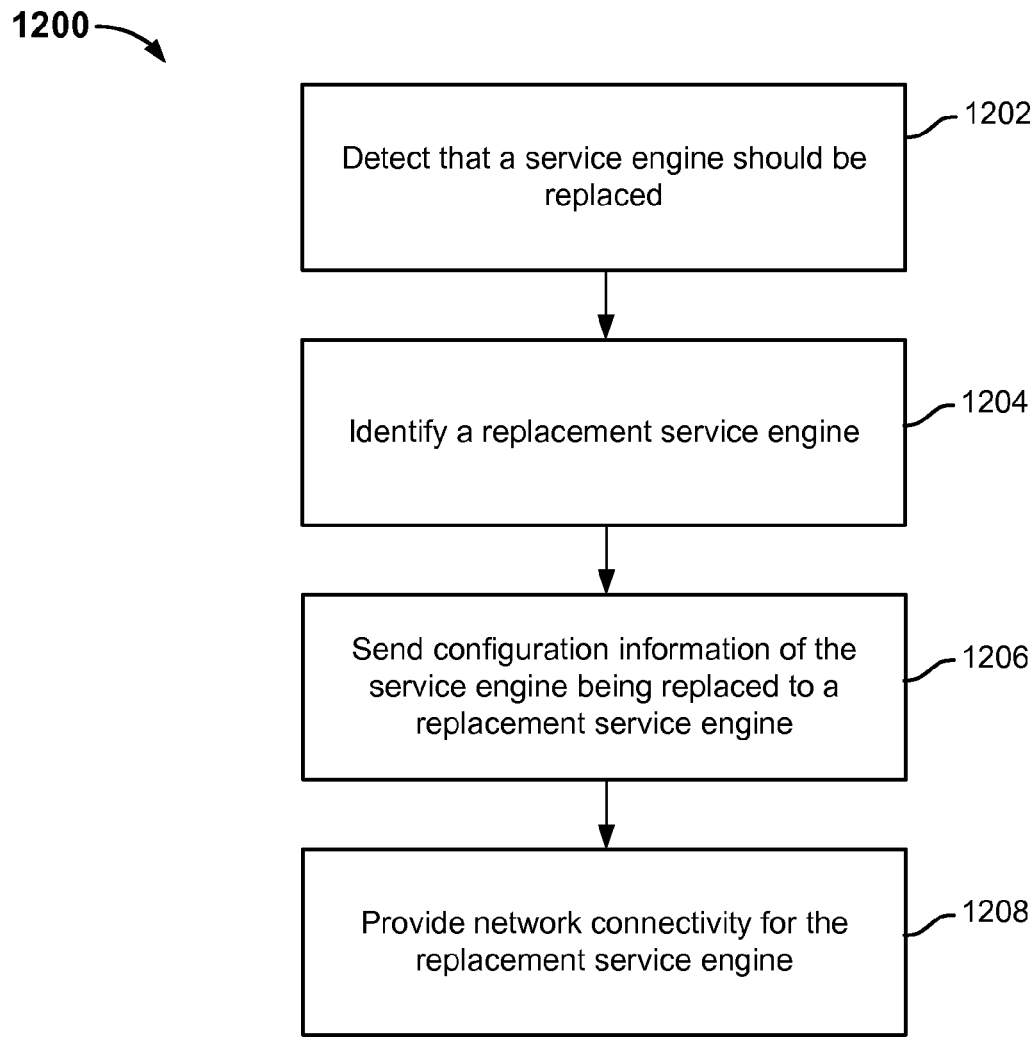
FIG. 12 is a flowchart illustrating an embodiment of a process to replace a service engine.

FIG. 12 is a flowchart illustrating an embodiment of a process to replace a service engine. In some embodiments, process 1200 is performed by the controller.

At 1202, it is determined that a service engine needs to be replaced. A service engine should be replaced if it has failed or needs to be moved. A service engine is deemed to have failed if the statistics information and/or the heartbeat information is not received correctly. The service engine may need to be moved due to upgrades or other maintenance-related events.

At 1204, a replacement service engine is identified. When a service engine needs to be moved due to maintenance, the replacement service engine is likely identified by the user performing the maintenance task. When a service engine fails, depending on implementation, a new service engine can be created to replace it, or an existing service engine can be selected as the replacement. Referring to FIG. 10 for an example, should service engine 214 fail, service engine 224 or 234 can be selected by the controller as the replacement, or a new service engine (not shown) can be created on a server that does not currently have a service engine by the virtualization infrastructure management application in response to an API call made by the controller. Process 1100 may be used to create the replacement service engine if a new one needs to be created.

At 1206, configuration information of the service engine being replaced is sent to the replacement service engine. For example, referring to FIG. 10, the load balancing policy associated with service engine 214 is sent by the controller to replacement service engine 224 to provide load balancing functions for web server applications. In some embodiments, some state information, such as active session information, is shared globally and therefore does not need to be resent unless the replacement service engine is newly created and without this information.

At 1208, network connectivity is provided for the replacement service engine. In some embodiments, the controller instructs the virtualization infrastructure management application to provide network connectivity to the replacement service engine. Specifically, the virtualization infrastructure management application is configured to program the virtual switch on the corresponding physical device to redirect data designated for a particular target application to the replacement service engine.

In another aspect, the controller is configured to communicate with the virtualization infrastructure to obtain data relating to the VMs. As discussed above in connection with FIGS. 9A, 9B, 11, and 12, the virtualization infrastructure management application provides a set of APIs, and the controller invokes these APIs to carry out management and control functions such as determining the location, configuration, and statistics information of target applications and their respective VMs, and service engines and service components configured to service the target applications; configuring the virtual switch to provide network connectivity to the service engines; etc.

Figure 13A:
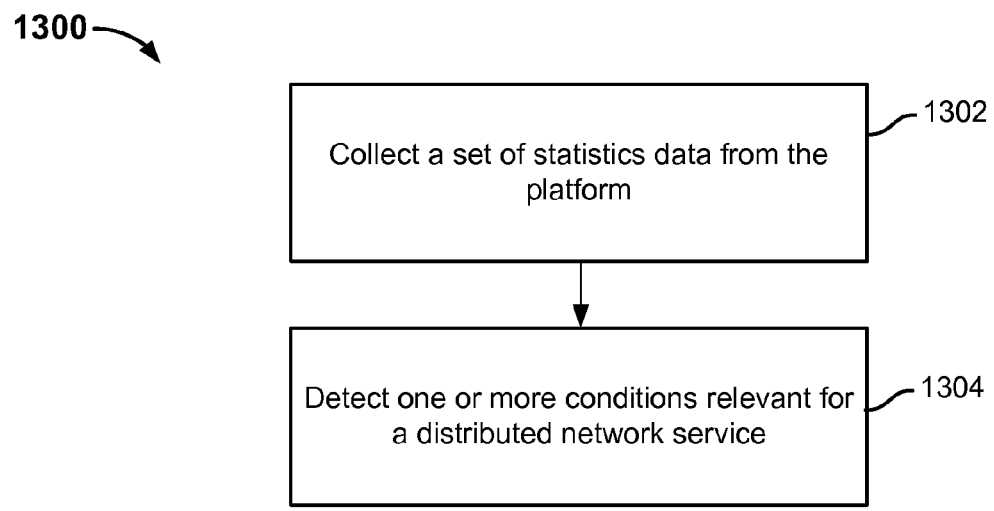
FIG. 13A is a flowchart illustrating an embodiment of a process to analyze statistics data.

In another aspect, the controller is configured to maintain statistics and state information, and provide analytics. FIG. 13A is a flowchart illustrating an embodiment of a process to analyze statistics data. At 1302 of process 1300, a set of data is collected. Examples of the collected data include statistics information such as performance metrics, log information, etc. The service engines may generate the data on their own, and/or collect it from the target applications, the service engines, and/or the virtualization manager application. Data may be sent at predefined intervals (e.g., every minute, every hour, etc.), as needed (e.g., every time a new connection is established by a load balancer, every time a connection is blocked by a firewall, etc.), or under other appropriate conditions.

The collected statistics data can be used to evaluate the performance of the target applications, the service engines, as well as the service component. The controller and/or the client application can analyze the collected data in any appropriate manner, such as determining statistics per VM, per service component, per device, etc. In this example, at 1304, collected data is used to detect certain condition(s) relevant for a distributed network service. In some embodiments, the data is correlated to detect any spikes or drops in various metrics during the same time period, and the detection results are presented to the user via the client application. For example, when the distributed network service is a security service such as a firewall, the signatures of connection requests are tracked by the service engines and aggregated by the controller. The collected data is correlated to determine whether there may be a security breach (e.g., a SYN flood where the number of SYN requests exceeds a certain threshold) under way. If so, a warning is provided to the user via the client application.

Figure 13B:
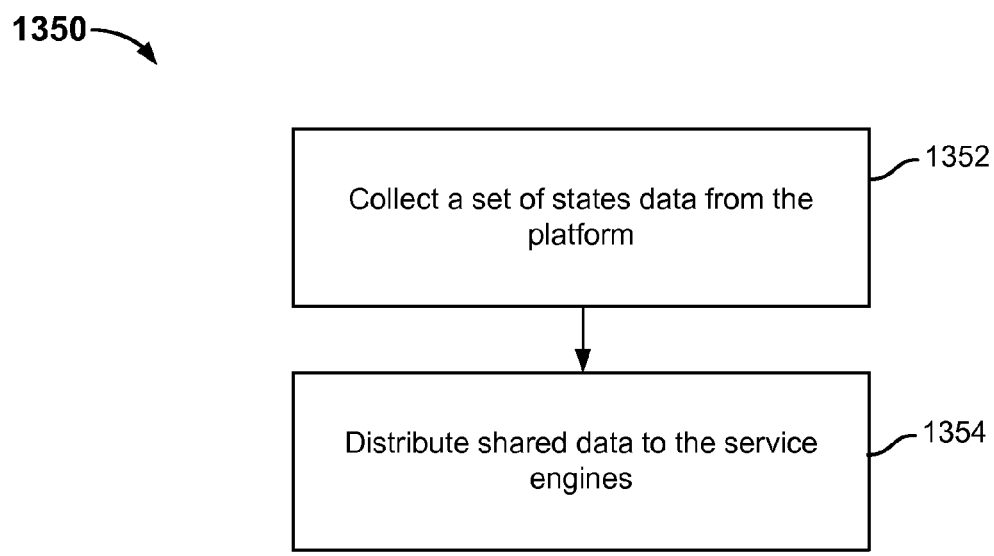
FIG. 13B is a flowchart illustrating an embodiment of a process to maintain state data.

FIG. 13B is a flowchart illustrating an embodiment of a process to maintain state data. At 1352 of process 1350, a set of state data is collected. Examples of the collected data include connection information pertaining to existing network sessions (e.g., persistence information, TLS/SSL protocol session information, connection limits, user sessions, etc.), state information indicating load on the application instances, health status of application instances, etc.

At 1354, some of the collected data (e.g., shared connection state information) is distributed to the service engines. In some embodiments, the shared data is kept locally at each device and synchronized. Synchronization can be performed using techniques similar to known techniques used in distributed databases.

In some embodiments, the shared data allows the target applications to coordinate their actions. For example, a shopping cart application needs to keep track of cart information for a particular session (typically identified based on the source address of the device). Thus, to provide load balancing service to a number of shopping cart target applications, the controller maintains a global mapping of active session information to shopping cart applications (e.g., session X is handled by shopping cart application 218, session Y is handled by shopping cart application 220, etc.), so that sessions associated with incoming packets are identified and redirected to the corresponding target applications. This mapping information is shared. Suppose a shopper's initial session is handled by application 218 on server 202. In some embodiments, the controller redistributes/synchronizes the session information (including the connection information based on the header information from the packet and which target application is handling the session) across the load balancers. If the shopper-user idles for a while then comes back to the same shopping website, packets from the resumed connection may be received on server 204. Based on shared session mapping, load balancer 254 on server 204 is aware that this session was previously handled by application 218 on server 202, and therefore redirects the session to application 218 to continue with the session.

In some alternative embodiments, the controller distributes/synchronizes application specific data to all the target applications. For example, information about items placed in the shopping cart can be distributed to all the shopping cart applications via the load balancer component so that data is consistent across the shopping cart applications. Thus, a resumed connection can be handled by any application to which the resumed session is load balanced. As another example, policy information is shared across all the service engines to guarantee high availability of the system. If one of the service engines fails, other service engines can continue to provide the service using the same policy information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A physical server comprising:
one or more communication interfaces configured to receive network traffic; and
one or more processors coupled to the one or more communication interfaces, configured to:
execute a service engine to participate in a distributed network service; and
execute a first target application instance in a first virtual machine (VM);
wherein:
the distributed network service is provided to at least the first target application instance executing in the first VM on the physical server, and to a second target application instance executing in a second VM on a second physical server;
the distributed network service is provided by receiving the network traffic on a plurality of virtual switches executing on respective physical servers, at least one virtual switch directing the network traffic to a service engine in a same physical server as the at least one virtual switch; and
a shared state of the distributed network service is maintained with respect to the physical server and with respect to the second physical server.

2. The physical server of claim 1, wherein the service engine is a part of a network service layer shared by at least the physical server and the second physical server.

3. The physical server of claim 1, wherein the distributed network service includes one or more of: a load balancing service, a security service, a content acceleration and transportation service, a network analytics service, or a compression service.

4. The physical server of claim 1, wherein to execute the service engine to participate in the distributed network service includes to:
receive a request to establish the distributed network service for at least the first target application instance and the second target application instance; and
configure the at least one virtual switch on a hypervisor to intercept traffic that is received by the at least one virtual switch and designated for the first VM.

5. The physical server of claim 4, wherein the at least one virtual switch is configured to be in-line with respect to the first VM.

6. The physical server of claim 1, wherein to configure the service engine to provide the distributed network service to the first target application instance further includes to activate the distributed network service.

7. The physical server of claim 1, wherein the shared state is a part of synchronized global information that is synchronized across the physical server and other physical servers.

8. The physical server of claim 1, wherein:
network traffic designated for the first target application instance is intercepted by the at least one virtual switch and redirected to the service engine; and
the distributed network service is applied to the network traffic designated for the first target application instance.

9. The physical server of claim 1, wherein:
the first target application instance is configured to operate in a first tier; and
the one or more processors are further configured to:
execute a third target application instance in a second tier;
perform the distributed network service on the network traffic with respect to target application instances that belong to the first tier; and
perform the distributed network service on the network traffic with respect to target application instances that belong to the second tier.

10. The physical server of claim 1, wherein:
the distributed network service includes a load balancing service; and
one of a plurality of target application instances executing on a respective plurality of physical servers is selected by the load balancing service as a selected target application instance to process a received packet.

11. The physical server of claim 1, wherein:
the distributed network service includes a load balancing service;
one of a plurality of target application instances executing on a respective plurality of physical servers is selected by the load balancing service as a selected target application instance to process a received packet; and
the selected target application instance is selected based at least in part on topological information.

12. A physical server comprising:
one or more communication interfaces configured to receive network traffic; and
one or more processors coupled to the one or more communication interfaces, configured to:
execute a service engine to participate in a distributed network service; and
execute a first target application instance in a first virtual machine (VM);
wherein:
the distributed network service is provided to at least the first target application instance executing in the first VM on the physical server, and to a second target application instance executing in a second VM on a second physical server;
a shared state of the distributed network service is maintained with respect to the physical server and with respect to the second physical server;
the distributed network service includes a load balancing service;
one of a plurality of target application instances executing on a respective plurality of physical servers is selected by the load balancing service as a selected target application instance to process a received packet;

the selected target application instance is selected based at least in part on topological information including a topological load $L_{ij}=C_i*(H_{ij}+1)$;

$L_{ij}$ corresponds to a load measurement of target application i with respect to load balancing component j;

$C_i$ corresponds to number of connections being handled by application i; and $H_{ij}$ corresponds to number of hops between target application i and the load balancing component j.

13. A method of providing a distributed network service, comprising:

receiving network traffic at a first physical server;

executing a service engine to participate in the distributed network service; and executing a first target application instance in a first virtual machine (VM);

wherein:

the distributed network service is provided to at least the first target application instance executing in the first VM on the first physical server, and to a second target application instance executing in a second VM on a second physical server;

the distributed network service is provided by receiving the network traffic on a plurality of virtual switches executing on respective physical servers, at least one virtual switch directing the network traffic to a service engine in a same physical server as the at least one virtual switch; and a shared state of the distributed network service is maintained with respect to the physical server and with respect to the second physical server.

14. The method of claim 13, further comprising sharing a network service layer with at least the second physical server, wherein the service engine is included in the network service layer.

15. The method of claim 13, wherein the distributed network service includes one or more of: a load balancing service, a security service, a content acceleration and transportation service, a network analytics service, or a compression service.

16. The method of claim 13, wherein executing the service engine to participate in the distributed network service includes:

receiving a request to establish the distributed network service for at least the first target application instance and the second target application instance; and configuring at least one virtual switch on a hypervisor to intercept traffic that is received by the at least one virtual switch and designated for the first VM.

17. The method of claim 16, wherein the at least one virtual switch is configured to be in-line with respect to the first VM.

18. The method of claim 13, wherein configuring the service engine to provide the distributed network service to the first target application instance further includes to activate the distributed network service.

19. The method of claim 13, wherein the shared state is a part of synchronized global information that is synchronized across at least the first physical server and the second physical server.

20. The method of claim 13, wherein:

network traffic designated for the first target application instance is intercepted by the at least one virtual switch and redirected to the service engine; and the distributed network service is applied to the network traffic designated for the first target application instance.

21. The method of claim 13, wherein:

the first target application instance is configured to operate in a first tier; and the method further comprises:

executing a third target application instance in a second tier;

performing the distributed network service on the network traffic with respect to target application instances that belong to the first tier; and performing the distributed network service on the network traffic with respect to target application instances that belong to the second tier.

22. The method of claim 13, wherein:

the distributed network service includes a load balancing service; and one of a plurality of target application instances executing on a respective plurality of physical servers is selected by the load balancing service as a selected target application instance to process a received packet.

23. The method of claim 13, wherein:

the distributed network service includes a load balancing service;

one of a plurality of target application instances executing on a respective plurality of physical servers is selected by the load balancing service as a selected target application instance to process a received packet; and the selected target application instance is selected based at least in part on topological information.

24. A method of providing a distributed network service, comprising:

receiving network traffic at a first physical server;

executing a service engine to participate in the distributed network service; and executing a first target application instance in a first virtual machine (VM);

wherein:

the distributed network service is provided to at least the first target application instance executing in the first VM on the physical server, and to a second target application instance executing in a second VM on a second physical server;

a shared state of the distributed network service is maintained with respect to the physical server and with respect to the second physical server;

the distributed network service includes a load balancing service;

one of a plurality of target application instances executing on a respective plurality of physical servers is selected by the load balancing service as a selected target application instance to process a received packet;

the selected target application instance is selected based at least in part on topological information including a topological load $L_{ij}=C_i*(H_{ij}+1)$;

$L_{ij}$ corresponds to a load measurement of target application i with respect to load balancing component j;

$C_i$ corresponds to number of connections being handled by application i; and $H_{ij}$ corresponds to number of hops between target application i and the load balancing component j.

25. A computer program product for providing a distributed network service, the computer program product being embodied in a non-transitory computer readable storage medium and comprising computer instructions for:

receiving network traffic at a first physical server;
executing a service engine to participate in the distributed network service;
executing a first target application instance in a first virtual machine (VM);
wherein:
- the distributed network service is provided to at least the first target application instance executing in the first VM on the physical server, and to a second target application instance executing in a second VM on a second physical server;
- the distributed network service is provided by receiving the network traffic on a plurality of virtual switches executing on respective physical servers, at least one virtual switch directing the network traffic to a service engine in a same physical server as the at least one virtual switch; and
- a shared state of the distributed network service is maintained with respect to the physical server and with respect to the second physical server.

26. The physical server of claim 1, wherein:
the service engine is configured to execute on the physical server;
a second service engine is configured to execute on the second physical server; and
the shared state is distributed to the service engine executing on the physical server and to the second service engine executing on the second physical server.

27. The physical server of claim 1, wherein the physical server and the second physical server cooperate to provide the distributed network service.

* * * * *